United States Patent [19]

Kee et al.

[11] Patent Number: 4,874,049
[45] Date of Patent: Oct. 17, 1989

[54] AUTOMATIC WEIGHING METHOD AND APPARATUS

[75] Inventors: Howard Kee, Palermo; Frederick Goff, Marysville, both of Calif.

[73] Assignee: Kee Equipment and Engineering, Oakland, Calif.

[21] Appl. No.: 306,814

[22] Filed: Feb. 3, 1989

[51] Int. Cl.$^4$ .................. G01G 13/16; G01G 13/24; G01G 13/02

[52] U.S. Cl. ........................ 177/59; 177/114; 177/119

[58] Field of Search ............... 177/1, 59, 114, 119, 177/120; 198/577

[56] References Cited

U.S. PATENT DOCUMENTS

| | | |
|---|---|---|
| 3,010,160 | 11/1961 | Lytton et al. |
| 3,530,973 | 9/1970 | Rossi .................. 198/577 X |
| 3,578,094 | 5/1971 | Nelson et al. .......... 177/119 X |
| 3,705,636 | 12/1972 | Dunphy et al. .......... 177/120 X |
| 3,734,215 | 5/1973 | Smith .................. 177/59 |
| 3,797,633 | 3/1974 | Stambera . |
| 3,828,869 | 8/1974 | Sellers . |
| 4,111,336 | 9/1978 | Ward et al. |
| 4,152,976 | 5/1979 | Kawasaki et al. |
| 4,247,019 | 1/1981 | Lerner . |
| 4,366,872 | 1/1983 | Brunnschweiler et al. .... 177/114 X |
| 4,571,926 | 2/1986 | Scully . |
| 4,609,058 | 9/1986 | Sashiki et al. |
| 4,629,017 | 12/1986 | Shroyer . |
| 4,765,488 | 8/1988 | Moriarity . |

Primary Examiner—George H. Miller, Jr.
Attorney, Agent, or Firm—Alfred A. Equitz

[57] ABSTRACT

A method and apparatus for accumulating a load having a desired weight, and then transferring the load to a reversible conveyor. The reversible conveyor extends between a pair of unloading stations, and is capable of delivering the load to either one of the unloading stations, depending upon the direction in which it is driven. In one class of preferred embodiments, the inventive apparatus is portable, and is capable of weighing out selected amounts of any of a variety of products (for example, frozen fish or other foods). In one such embodiment, the invention includes a single gated bin which feeds a single weighing hopper, and a vibrating conveyor mounted on a vibration-absorbing frame assembly for feeding the gated bin. The weighing hopper (which does not vibrate) feeds as reversible conveyor, and the reversible conveyor in turn feeds two unloading stations. In another such preferred embodiment, the invention includes two gated bins (each mounted on a vibration absorbing frame assembly), two weighing hoppers, two reversible conveyors, and four unloading stations. Material from the vibrating conveyor is separated into two streams, and each stream is fed to one of the gated bins. Each gated bin is independently controllable, and each feeds a different weighing hopper. Each hopper feeds a different reversible conveyor, and each reversible conveyor in turn feeds two unloading stations. Means are provided for directing the material selectively to one or the other of the gated bins.

23 Claims, 5 Drawing Sheets

AUTOMATIC WEIGHING METHOD AND APPARATUS

FIELD OF THE INVENTION

The invention is a method and apparatus for separating a load into portions, each portion having a selected weight. More particularly, the invention is a method and apparatus for accumulating desired portions of a load by weight, and then transferring such portions to a reversible conveyor.

BACKGROUND OF THE INVENTION

In one type of conventional weighing system, material is supplied from a very large vibrating bin (having a one thousand pound capacity, for example) to a gated bin. A gate periodically opens to release material accumulate in the gated bin to a weighing hopper. Upon accumulation of a desired load of material in the hopper, the hopper releases the load.

Some conventional systems of this type have employed two vibrating conveyor paths from the vibrating bin, each path having a gate, for alternately feeding a single weighing hopper.

However, conventional weighing systems have been extremely heavy and bulky. Furthermore, conventional weighing systems have been incapable of rapidly weighing many loads.

In contrast, the inventive apparatus is portable due to its simple, compact, and light-weight design. Further, the inventive apparatus is capable of extremely rapid operation, with a weighing rate of up to thirty loads per minute or more for a wide range of materials (such as frozen foods).

SUMMARY OF THE INVENTION

The invention is a method and apparatus for accumulating a load having a desired weight, and then transferring such load to a reversible conveyor. The reversible conveyor extends between a pair of unloading stations, and is thus capable of delivering the load to either one of the unloading stations, depending upon the direction in which it is driven. If the conveyor's direction is periodically reversed, the inventive apparatus is capable of very rapid operation, and can achieve weighing rates of up to thirty loads per minute or more.

In one class of preferred embodiments, the inventive apparatus is portable, and is capable of weighing out selected amounts of any of a variety of products (for example, frozen fish or other foods). In one such embodiment, the invention includes a single gated bin which feeds a single weighing hopper, and a vibrating conveyor mounted on a vibration-absorbing frame assembly for feeding the gated bin. The weighing hopper (which does not vibrate) feeds a reversible conveyor, and the reversible conveyor in turn feeds two unloading stations.

In another such preferred embodiment, the invention includes two gated bins (each mounted on a vibration absorbing frame assembly), two weighing hoppers, two reversible conveyors, and four unloading stations. Material from the vibrating conveyor is separated into two streams, and each stream is fed to one of the gated bins. Each gated bin is independently controllable, and each feeds a different weighing hopper. Each hopper feeds a different reversible conveyor, and each reversible conveyor in turn feeds two unloading stations. Means are provided for directing the material selectively to one or the other of the gated bins.

DETAILED DESCRIPTION OF THE PREFERRED EMBODIMENTS

Figure 1:
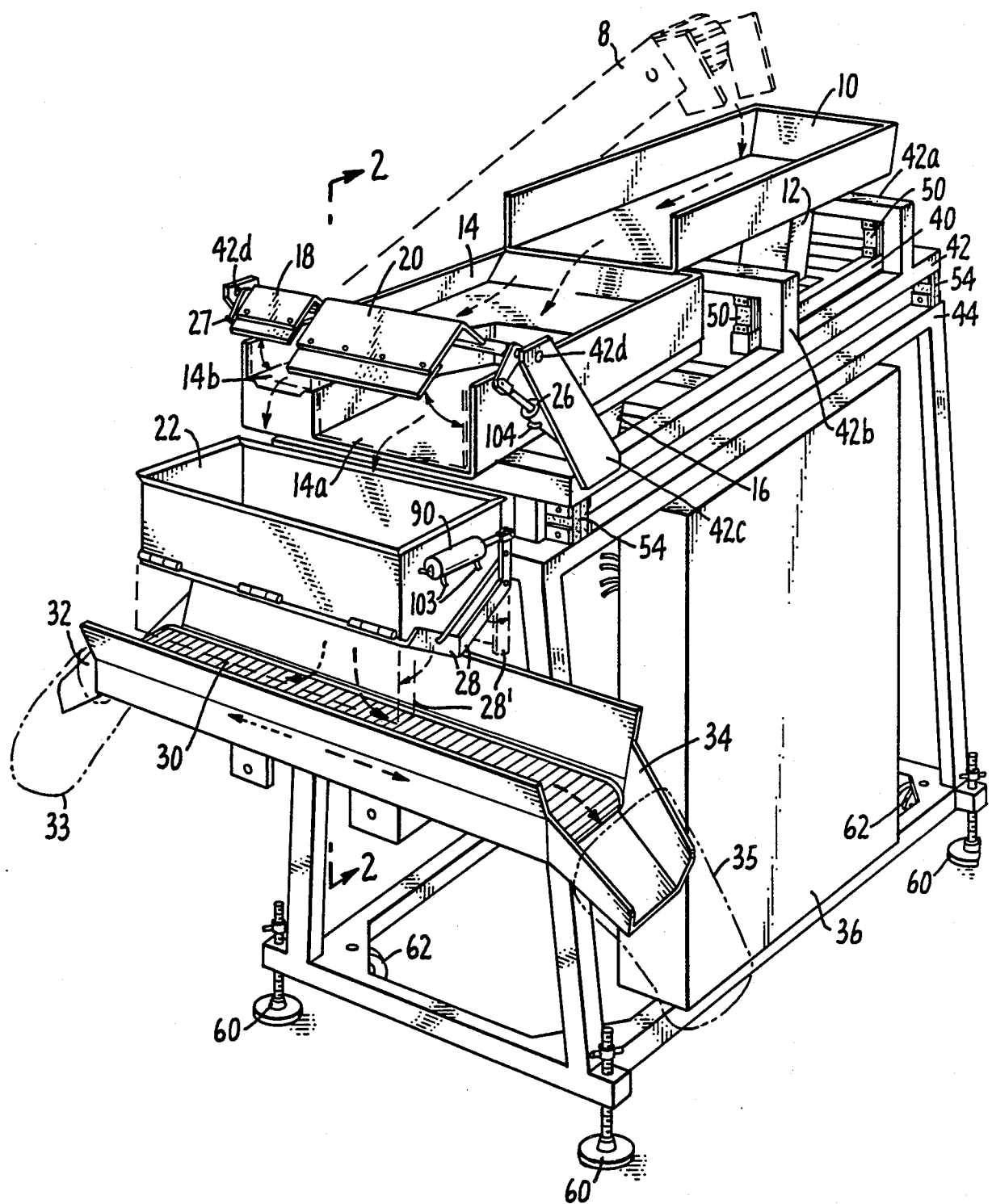
FIG. 1 is a perspective view of an apparatus embodying a preferred embodiment of the invention.
Figure 2:
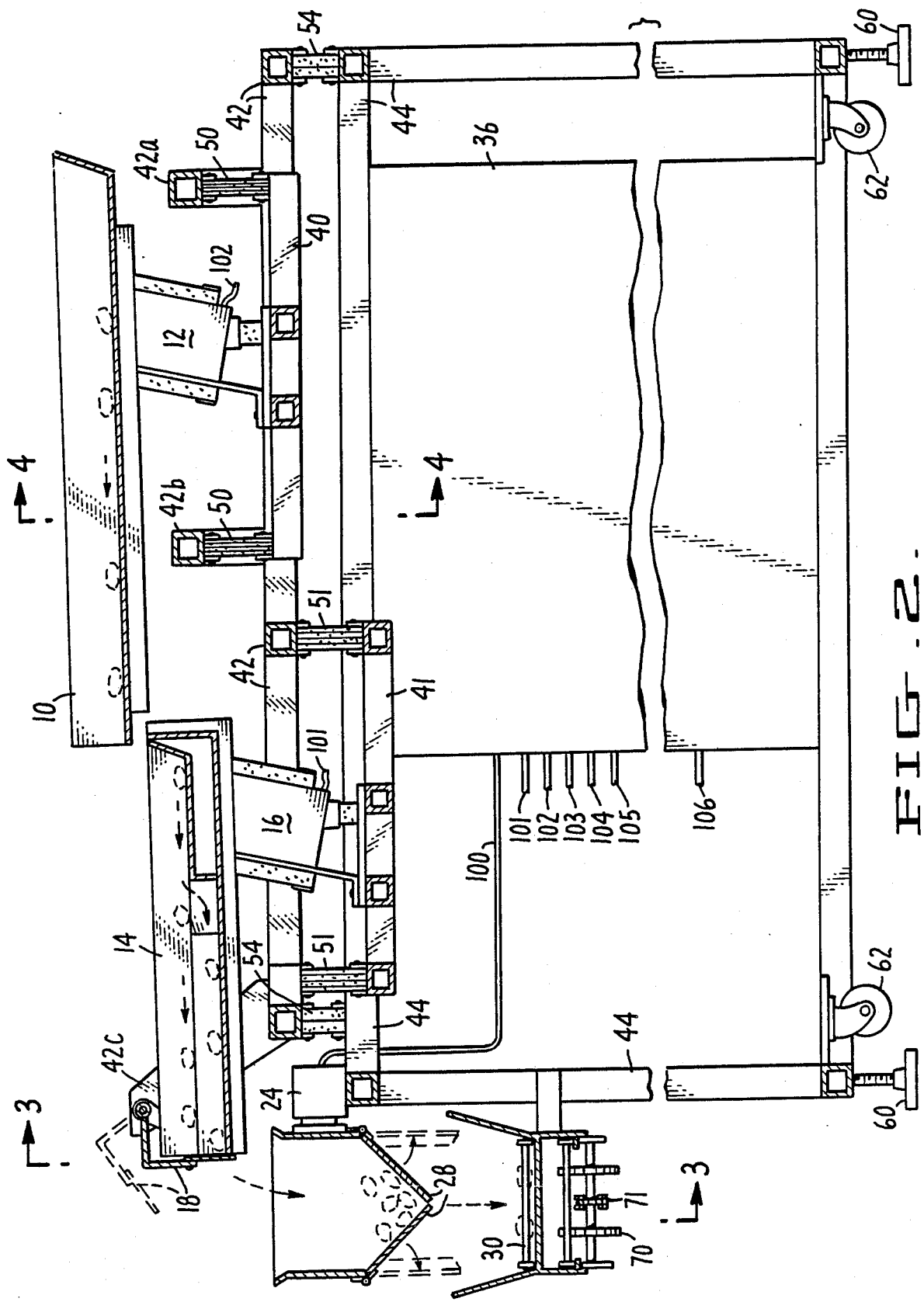
FIG. 2 is a cross-sectional view of the apparatus shown in FIG. 1, in the plane defined by line 2—2 in FIG. 1.

A preferred embodiment of the inventive apparatus will be described with reference to FIGS. 1–5 and 7. In this embodiment, the invention includes a vibrating conveyor 10 for supplying material to gated bin 14. The material may be supplied to conveyor 10 from a feed conveyor 8 (shown in phantom view in FIG. 1). Bin 14 includes independently and remotely controllable gates 18 and 20, gate control unit 26 for opening and closing gate 20 in response to control signals supplied from microprocessor 36, and gate control unit 27 (shown in FIG. 3) for opening and closing gate 18 in response to control signals supplied from microprocessor 36. The control signals for opening gates 18 and 20 (in order to release the material accumulated in bin 14) are supplied from microprocessor 36 to gate control means 26 and 27 on line 104 and 106 (shown in FIG. 3), respectively. When one or both of gates 18 and 20 opens, material from bin 14 falls into weighing hopper 22.

A load cell 24 (shown in FIG. 2) is connected to hopper 22. Load cell 24 asserts a release signal on line 100 when load cell 24 determines that the weight of material in hopper 22 has increased to a pre-selected value. The load cell output signal is supplied to microprocessor 36. In response to the load cell output signal, microprocessor 36 generate control signals for causing the accumulated product within hopper 22 to be released, and supplies such control signals on lines 103 to hopper release means 90. The microprocessor may readily be programmed by one of ordinary skill in the art of computer programming to generate such control signals when the amplitude of the load cell output signal rises to a level specified by the system operator. In response to an appropriate control signal received on lines 103, means 90 will open hopper doors 28 to allow the material within hopper 22 to fall onto conveyor 30. In FIG. 1, the "open" position of doors 28 is shown in phantom view, and is identified by reference numerals 28'.

A load cell suitable for use a load cell 24 may be selected from those commercially available. It is contemplated that other types of weight sensors may be substituted for load cell 24 in alternative embodiments of the invention.

It is also contemplated that weighing hoppers of varying size and shape may be interchangeably mounted on the inventive apparatus, to accommodate products of different size and shape.

The frequency at which each of gates 18 and 20 opens is preferably controlled by a feedback circuit including microprocessor 36, load cell 24, and line 100 (which connects load cell 24 and microprocessor 36). In response to the output signal from load cell 24, microprocessor 36 generates control signals for means 26 and means 27. Such control signals determine the opening frequency of gates 18 and 20 independently. Microprocessor 36 may readily be programmed by one of ordinary skill in the art of computer programming to generate control signals for decreasing (increasing) the gate opening frequency in respone to an increase (decrease) in the amplitude of the load cell output signal, or for varying each gate opening frequency in any other desired manner in response to variations in the load cell output signal.

The invention is capable of operating at any of a wide range of operator-selected speeds. The operating speed may be varied by an appropriate software command in appropriately programmed microprocessor 36. The feedback means described in the previous paragraph allows the invention to remain in accurate operating mode despite surges in the product stream traversing conveyor 10.

Upon release from weighing hopper 22, the weighed quantity of product falls onto reversible conveyor 30. The reversible conveyor's direction is preferably reversed after each product release from hopper 22, so that reversible conveyor 30 alternately feeds unloading stations 32 and 34. Bags 33 and 35 (shown in phantom view), or automatic bag sealing equipment (not shown) may be mounted at each of the unloading stations.

It is contemplated that any of a wide variety of articles may be processed by the inventive apparatus. By alternately feeding two unloading stations using reversible conveyor 30, the inventive system is capable of rapidly weighing quantities of the product and distributing them for rapid unloading. Where the product being weighed is a quantity of frozen food pieces (such as frozen fish), the inventive system is designed to achieve weighing rates of up to thirty product loads per minute or more.

Figure 3:
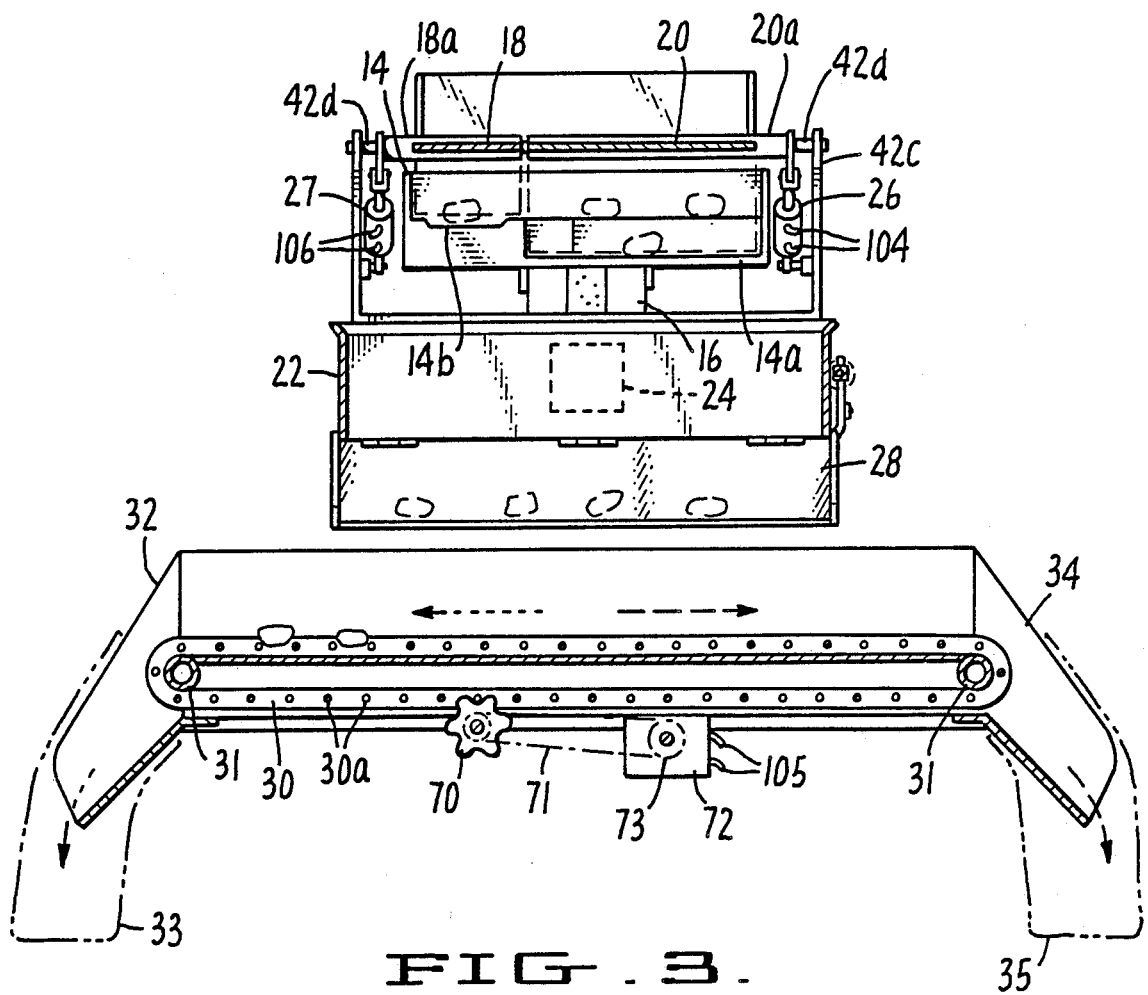
FIG. 3 is a cross-sectional view of a portion of the apparatus shown in FIG. 2, in the plane defined by line 3—3 in FIG. 2.
Figure 4:
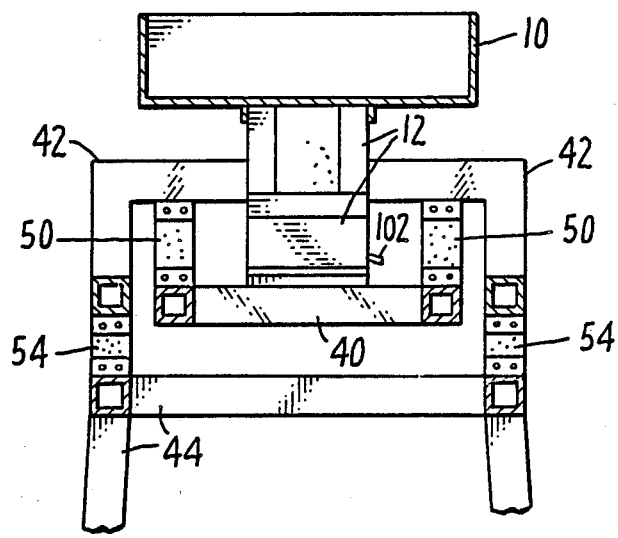
FIG. 4 is a cross-sectional view of a portion of the apparatus shown in FIG. 2, in the plane defined by line 4—4 in FIG. 2.

One mechanism for driving reversible conveyor 30 is shown in FIG. 3. Conveyor 3 is looped around rotatable wheels 31. Drive belt 71 extend around sprocket 70 and wheel 73. In response to control signals received from microprocessor 36 on lines 105, drive unit 72 causes wheel 73 to rotate in a clockwise or counterclockwise direction. As wheel 73 rotates, belt 71 causes sprocket 70 to rotate. As sprocket 70 rotates, its sprocket teeth engage with pins 30a extending out from conveyor 30, to cause conveyor 30 to rotate in a rotational direction opposite to that in which sprocket 70 rotates.

Preferably, the control signals received on lines 105 cause reversible conveyor 30 to rotate while hopper 22 discharges a load, so that the load will spread along conveyor 30. Such spreading of the load along conveyor 30 has the desirable result that the bags at unloading stations 32 and 34 will fill more evenly.

A vibrator 12 is mounted is direct contact with conveyor 10, to cause conveyor 10 to vibrate so as to provide a more uniform product strem to gated bin 14. Gated bin 14 may similarly be vibrated by a vibrator 16 mounted in direct contact therewith. Vibrating conveyor 10 and vibrator 12 are mounted on an inner frame 40. Inner frame 40 is in turn suspended from an intermediate frame 42 by vibration absorbing connectors 50. Connectors 50 are preferably polyvinyl chloride strips. Intermediate frame 42 is attached to an outer frame 44 by vibration absorbing connectors 54. Connectors 50 and 54 ensure that outer frame 44 is substantially vibration-free even when conveyor 10 is vibrating.

Intermediate frame 42 includes raised portions 42a and 42b (best shown in FIG. 7) from which vibration absorbing connectors 50 are suspended. Intermediate frame 42 also includes arms 42c. Rod 42d extends between arms 42c. Gates 18 and 20 are rotatably mounted on rod 42d. Specifically, rod 42d extends through sleeve portion 18a of gate 18 and sleeve portion 20a of gate 20, so that the two gates may be independently rotated by means 106 and 104, respectively.

Gated bin 14 and vibrator 16 are also mounted on an inner frame 41. Inner frame 41 is in turn suspended from intermediate frame 42 by vibration absorbing connectors 51. Connectors 51 are preferably polyvinyl chloride strips. Connectors 51 (and vibration absorbing connectors 54 between frames 42 and 44) ensure that outer frame 44 is substantially vibration-free even when gated bin 14 is vibrating.

Weighing hopper 22 and load cell 24 are mounted on outer frame 44, so as also to be substantially vibration-free when conveyor 10 and gated bin 14 are vibrating.

Figure 5:
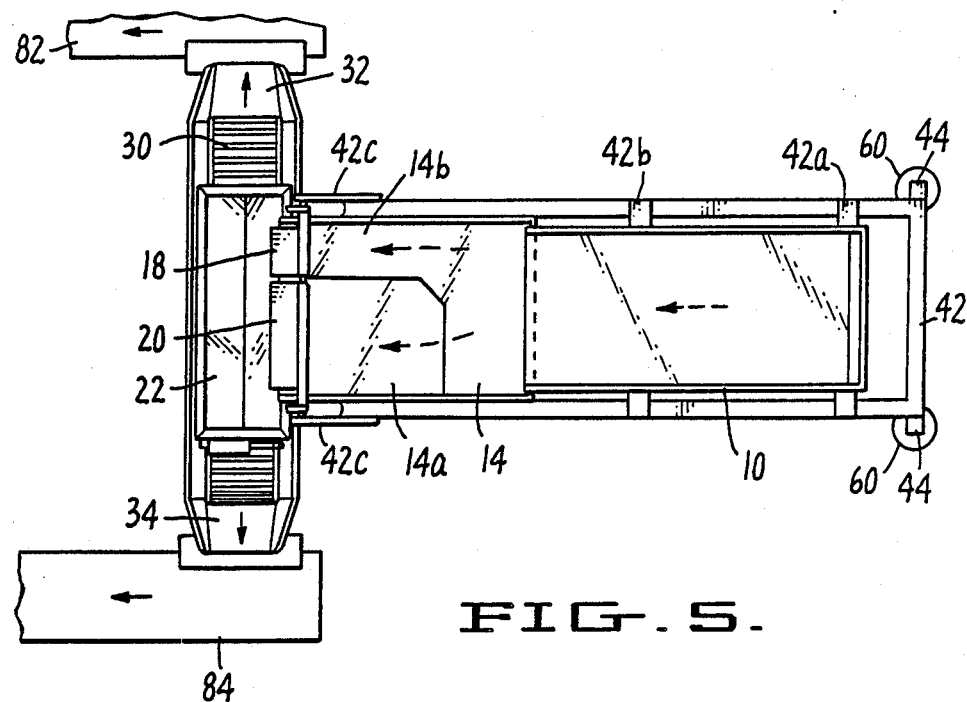
FIG. 5 is a plan view of a portion of the apparatus shown in FIG. 1.

In FIG. 5, parallel conveyors 82 and 84 (rather than bags, shown in phantom view in FIGS. 1 and 3) are positioned to receive material from unloading stations 32 and 34, respectively. Intermediate frame 42 is visible in FIG. 5, but inner frames 440 and 41, and outer frame 44 are obscured by the other system components.

In the preferred embodiment shown in FIGS. 1-5 and 7, gated bin 14 has a deeper portion 14a and a shallower portion 14b. Smaller amounts of material will accumulate in portion 14b than in portion 14a during a given time interval. Assuming that both gates 18 and 20 are opened with the same frequency, each time gate 18 is opened, a smaller amount of material will fall from portion 14b into hopper 22 than will fall from portion 14a when gate 20 is opened.

The system of the invention is compact, light-weight, and has a simple design with few components. Only a few components of the system vibrate, and the components that do vibrate are compact and light-weight. Thus, for example, vibrating frames 40 and 41 are preferably formed from light gauge metal while frame 44 is formed from heavy gauge metal and frame 42 is formed from intermediate gauge metal.

The inventive system is sufficiently light-weight to be conveniently portable. To transport the system (for example, in order to reconfigure a large food processing system of which the invention comprises one part), frame 44 is lowered relative to adjustable screw legs 60 until wheels 62 attached to frame 44 engage the floor. The inventive system may then be rolled on wheels 62 to a new location.

Legs 60 may be individually adjusted to tilt the inventive system into any desired orientation (for example, to tilt bin 14 so as to lower bin portion 14a relative to bin portion 14b).

An alternative embodiment of the invention, including two sets of gated bins and two weighing hoppers, will next be described with reference to FIG. 6. The FIG. 6 embodiment includes a wedge-shaped member 100 for diverting material discharging thereon from vibrating conveyor 10 into two product streams. One product stream falls from member 100 onto gated bin 114, and the other product stream falls from member 100 onto gated bin 214.

The "first" assembly comprising gated bin 114, gates 118 and 120, weighing hopper 122 (with an associated load cell not shown in FIG. 6)), reversible conveyor 130, and unloading stations 132 and 134, is identical to the similarly numbered assembly of FIGS. 1-5 comprising gated bin 14, gates 18 and 20, weighing hopper 22, load cell 24, reversible conveyor 30, and unloading stations 32 and 34. Furthermore, the "second" assembly in FIG. 6 comprising gated bin 214, gates 218 and 220, weighing hopper 222 (with associated load cell), reversible conveyor 230, and unloading stations 232 and 234, is identical to the "first" assembly in FIG. 6 comprising gated bin 114, gates 118 and 120, weighing hopper 122 (with an associated load cell), reversible conveyor 130, and unloading stations 132 and 134. Parallel conveyors 182 and 184 in FIG. 6 are identical to parallel conveyors 82 and 84 in FIG. 5, and parallel conveyors 282 and 284 in FIG. 6 are identical to parallel conveyors 82 and 84 in FIG. 5.

Figure 6:
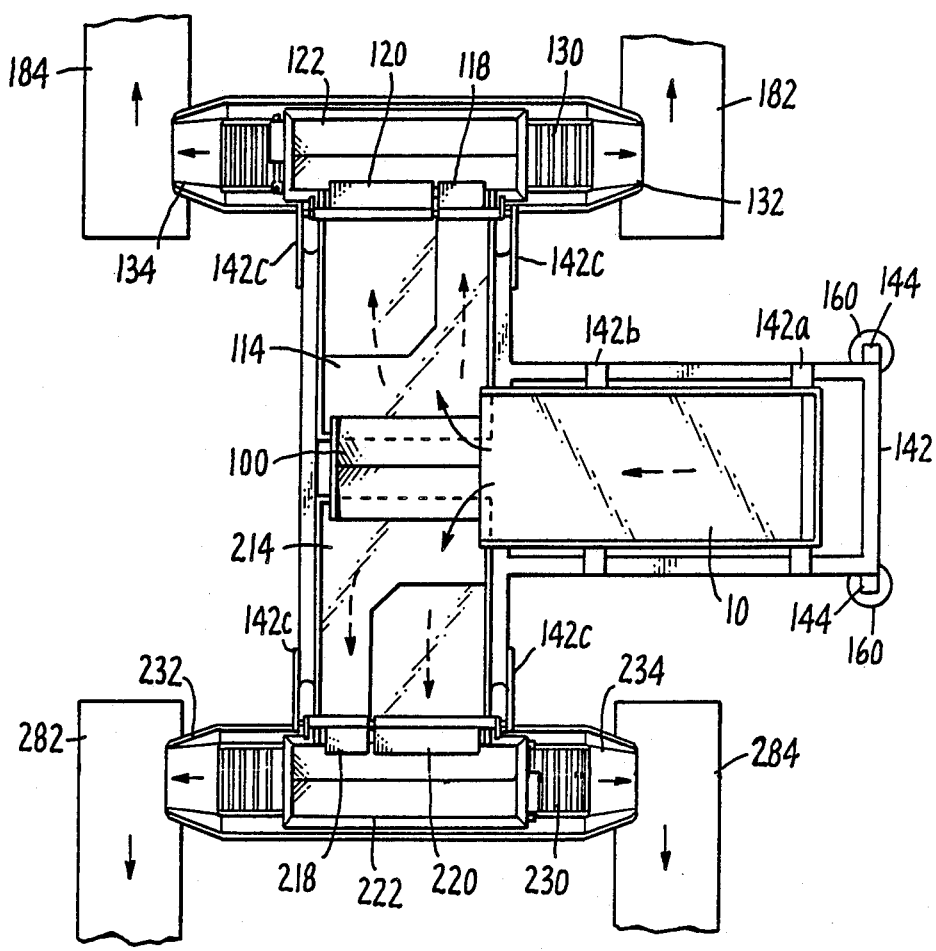
FIG. 6 is a partial plan view of a variation on the FIG. 1 apparatus which includes two reversible conveyors.
Figure 7:
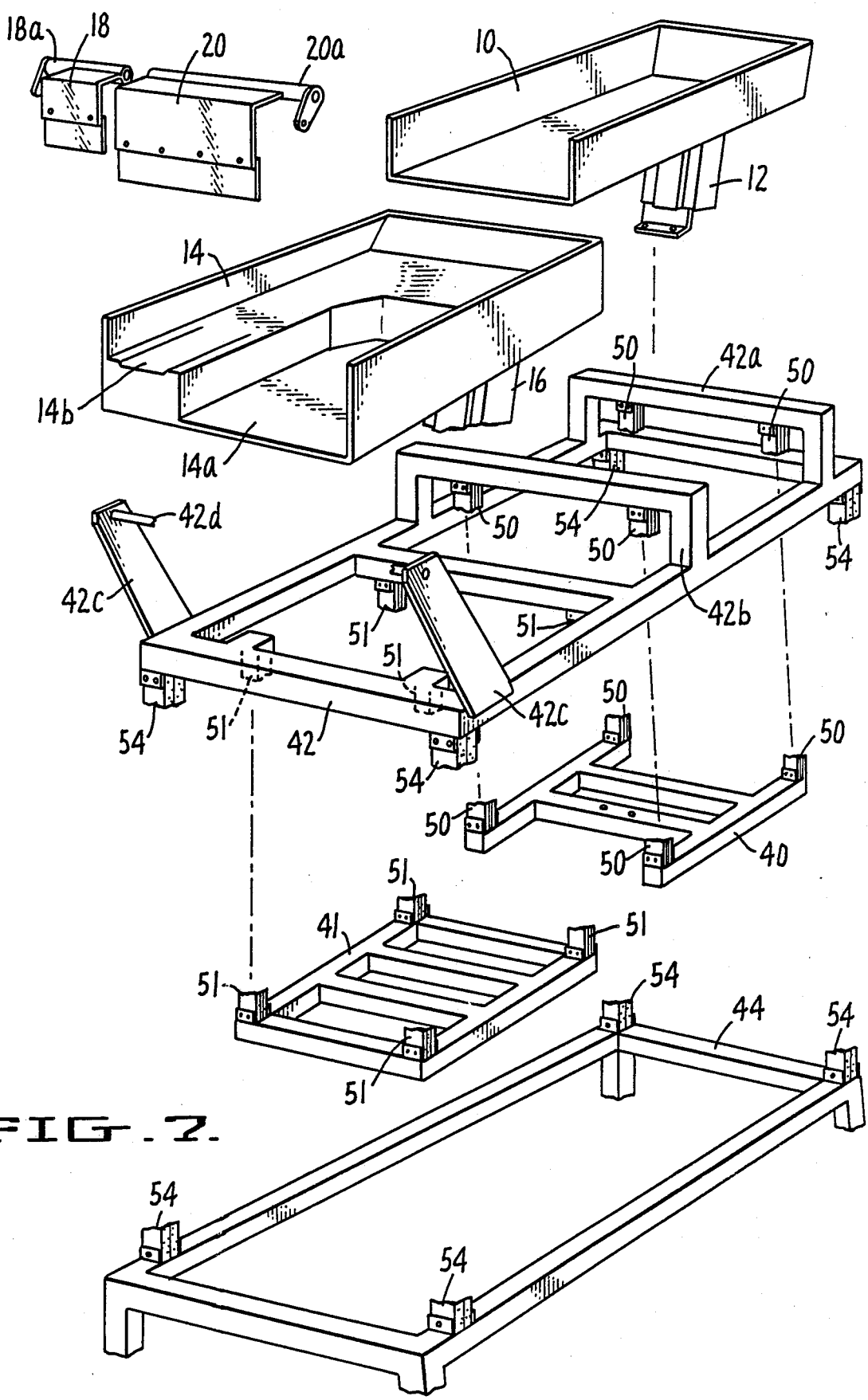
FIG. 7 is an exploded view of the frame of the FIG. 1 apparatus.

A single microprocessor may be provided for controlling both the first and second assemblies in FIG. 6. Alternatively, two microprocessors (one each for the first and the second assembly) may be provided for this purpose.

Intermediate frame 142 of FIG. 6 is similar to intermediate frame 42 in FIGS. 1-5 and 7, and differs from frame 42 only in that it is "T-shaped" rather than rectangular. Thus, frame 142 includes four arms 142c, unlike frame 42 (which includes only two arms 42c). Two of arms 142c are for supporting gates 118 and 120, and the other two are for supporting gates 218 and 220. An inner frame (obscured by the other system components in FIG. 6) identical to frame 40 is suspended from portions 142b of frame 142 for mounting conveyor 10, and inner frames (also obscured by the other system components in FIG. 6) identical to frame 41 are also suspended from portions 142b of frame 142 for mounting bins 114 and 214, respectively. An outer frame 144 (partially obscured beneath the other system components in FIG. 6) similar to frame 44 (but having a "T-shape" rather than a rectangular shape) supports all components of the FIG. 6 embodiment. Outer frame is preferably mounted on adjustable legs 160 identical to legs 60 on which frame 44 is mounted in FIG. 1. By independently adjusting legs 160 (only two of which are shown in FIG. 6), it is contemplated that the FIG. 6 system may be tilted into any desired orientation (for example, so as to lower bin 114 relative to bin 214).

The inventive method may be implemented by either described embodiment of the inventive apparatus. The inventive method includes the steps of: (a) periodically releasing material from a bin into a weighing hopper; (b) monitoring the weight of material in the hopper with a load cell; (c) while rotating a reversible conveyor, releasing the material from the hopper onto the reversible conveyor upon determining that a predetermined weight of material has accumulated in the hopper; then, (d) reversing the rotational direction of the conveyor; and (e) while rotating the conveyor in the reversed direction, repeating steps (a), (b), and (c). Preferably, the bin (but not the weighing hopper, load cell, and reversible conveyor) is vibrated while steps (a) through (e) are performed.

The foregoing is merely illustrative and explanatory of the inventive method and apparatus. Various changes in the component sizes and shapes, and other details of the embodiments described herein may be within the scope of the appended claims.

What is claimed is:

1. An apparatus for weighing material, including:
   a first gated bin for receiving and accumulating portions of the material, and including a means for releasing the material accumulated therein;
   a first weighing hopper, positioned for receiving and accumulating the material released from the first gated bin, and including a means for releasing the material accumulated therein;
   a first weight sensor coupled to the first hopper, for generating a weight signal indicative of the weight of material in the first hopper; and
   a first reversible conveyor, positioned for receiving the material released from the first hopper.

2. The apparatus of claim 1, also including:
   a first inner frame assembly;
   an outer frame assembly;
   a first vibration-absorbing means connecting the first inner frame assembly and the outer frame assembly; and
   a vibrating conveyor mounted on the first inner frame assembly, and positioned for feeding material to the first gated bin;
   wherein the first weighing hopper and the first weight sensor are mounted on the outer frame assembly, so that the first weighing hopper and the first weight sensor do not vibrate significantly during vibration of the vibrating conveyor.

3. The apparatus of claim 2, also including:
   a second inner frame assembly;
   a second vibration-absorbing means connecting the second inner frame assembly and the outer frame assembly; and
   a vibrator, mounted on the second inner frame assembly and connected to the gated bin, for vibrating the gated bin.

4. The apparatus of claim 2, also including:
   adjustable legs supporting the outer frame assembly, wherein the adjustable legs may be adjusted to tilt the outer frame assembly.

5. The apparatus of claim 2, wherein the first inner frame assembly includes:
   a first frame;
   a first set of vibration absorbing connectors;
   a second frame suspended from the first frame by said first set of vibration absorbing connectors; and
   a second set of vibration absorbing connectors connecting the first frame with the outer frame assembly.

6. The apparatus of claim 5, wherein the connectors comprising the first set are polyvinyl chloride strips.

7. The apparatus of claim 5, wherein the second frame comprises relatively light gauge metal, the first frame comprise intermediate gauge metal, and the outer frame assembly comprises relatively heavy gauge metal.

8. The apparatus of claim 1, wherein the weight sensor is a load cell.

9. The apparatus of claim 1, wherein the means for releasing the material accumulated in the first gated bin includes a gate and a remotely controllable gate control unit, and also including:
   a microprocessor connected to the gate control unit, wherein the microprocessor is programmed to generate gate control signals and to supply the gate control signals to the gate control unit for causing the gate to open with a desired frequency.

10. The apparatus of claim 9, wherein the microprocessor is coupled to the first weight sensor so that the microprocessor receives the weight signal, and wherein the microprocessor is programmed to generate gate control signals which vary the gate opening frequency in response to variations in the weight signal.

11. The apparatus of claim 1, also including:
a second gated bin for receiving and accumulating portions of the material, and including a means for releasing the material accumulated therein;
a second weighing hopper, positioned for receiving and accumulating the material released from the second gated bin, and including a means for releasing the material accumulated therein;
a second weight sensor coupled to the second hopper, for generating a weight signal indicative of the weight of material in the second hopper; and
a second reversible conveyor, positioned for receiving the material released from the second hopper.

12. The apparatus of claim 11, also including:
a wedge-shaped member positioned between the first gated bin and the second gated bin;
an inner frame assembly; and
a vibrating conveyor mounted on the inner frame assembly, and positioned for discharging material onto the wedge-shaped member, so that some of the discharged material will be diverted by the wedge-shaped member into the first gated bin, and some of the discharged material will be diverted by the wedge-shaped member into the second gated bin.

13. The apparatus of claim 12, wherein the first gated bin and the second gated bin are mounted on the inner frame assembly.

14. The apparatus of claim 13, also including:
a first vibrator, mounted on the inner frame assembly and connected to the first gated bin, for vibrating the first gated bin.

15. The apparatus of claim 14, also including:
a second vibrator, mounted on the inner frame assembly and connected to the second gated bin, for vibrating the second gated bin.

16. The apparatus of claim 13, also including:
a conveyor vibrator mounted on the inner frame assembly and connected to the vibrating conveyor, for vibrating the vibrating conveyor.

17. The apparatus of claim 12, also including an outer frame assembly, and wherein the first weighing hopper, the first weight sensor, the second weighing hopper, and the second weighing sensor are mounted on the outer frame assembly.

18. The apparatus of claim 17, also including:
adjustable legs supporting the outer frame assembly, wherein the adjustable legs may be adjusted to tilt the outer frame assembly in order to change the relative altitude of the first gated bin and the second gated bin.

19. The apparatus of claim 12, wherein the weight sensor is a load cell.

20. A method of weighing material, including the steps of:
(a) periodically releasing material from a bin into a weighing hopper;
(b) monitoring the weight of the material in the hopper as the material accumulates in the hopper;
(c) while rotating a reversible conveyor, releasing the material from the hopper onto the reversible conveyor upon determining that a predetermined weight of material has accumulated in the hopper;
(d) after step (c), reversing the rotational direction of the conveyor; and
(e) while rotating the conveyor in the reversed direction, repeating steps (a), (b), and (c).

21. The method of claim 20, also including the step of vibrating the bin, but preventing the weighing hopper and the reversible conveyor from vibrating, while performing steps (a) through (e).

22. The method of claim 20, wherein the bin includes a gate and a remotely controllable gate control unit, and wherein step (a) includes the operations of generating gate control signals in a microprocessor and supplying the gate control signals to the gate control unit for causing the gate to open with a desired frequency.

23. The method of claim 22, wherein step (b) includes the operations of generating a weight signal indicative of the weight of material in the hopper and supplying the weight signal to the microprocessor, and wherein step (a) includes the operations of generating the gate control signals in a manner so that the gate control will vary the gate opening frequency in response to variations in the weight signal received by the microprocessor.

* * * * *